United States Patent [19]

Long et al.

[11] Patent Number: 4,922,363

[45] Date of Patent: May 1, 1990

[54] CONTACTOR CONTROL SYSTEM

[75] Inventors: Edward A. Long, Durham; James W. Hamilton, Jr., Mebane, both of N.C.

[73] Assignee: General Electric Company, Plainville, Conn.

[21] Appl. No.: 182,904

[22] Filed: Apr. 18, 1988

Related U.S. Application Data

[63] Continuation of Ser. No. 788,361, Oct. 17, 1985, abandoned.

[51] Int. Cl.$^5$ ............................................. H02H 3/033
[52] U.S. Cl. .......................................... 361/3; 361/5; 361/2; 361/87; 361/146; 364/483
[58] Field of Search ............... 361/140, 146, 152, 153, 361/170, 185, 186, 195, 196, 159, 1–7, 13, 86, 87, 114; 364/483

[56] References Cited

U.S. PATENT DOCUMENTS

| | | | |
|---|---|---|---|
| 4,153,922 | 5/1979 | Azume et al. | 361/3 |
| 4,356,525 | 10/1982 | Kornrumpf et al. | 361/4 |
| 4,392,171 | 7/1983 | Kornrumpf | 361/5 |
| 4,399,483 | 8/1983 | Phelan | 361/154 |
| 4,445,183 | 4/1984 | McCollum et al. | 361 X/483 |
| 4,536,188 | 8/1985 | Nielsen | 361/152 |
| 4,709,296 | 11/1987 | Hung et al. | 361/7 |

Primary Examiner—Todd E. Deboer
Attorney, Agent, or Firm—James H. Beusse; Walter C. Bernkopf

[57] ABSTRACT

A method and apparatus in a control system for an electromagnetic contactor for reducing multiple re-ignitions incorporates a regulated source of electrical power coupled to a contactor actuating coil through a controllable switch. The switch is used to regulate coil current to a desired value whereby opening time of the contactor can be determined within a defined range. Alternating current through tips of the contactor is monitored and each zero crossing of the current wave form is determined. The control system responds to a command to open the contactor tips by coordinating such opening with the zero crossings of the current wave form whereby the contact tips separate within a predetermined phase angle prior to a zero crossing. The system also includes apparatus for detecting a fault current of the alternating current in the contact tips and for inhibiting operation of the contact tips for a predetermined time interval in order to allow fuses to clear the fault prior to opening the contactor.

14 Claims, 13 Drawing Sheets

CONTACTOR CONTROL SYSTEM

This is a continuation, of application Ser. No. 788,361, filed Oct. 17, 1985 now abandoned.

The present invention relates to control systems for electromechanical contactors.

Medium voltage control gear employs electromechanical contactors that handle normal switching currents up to their interrupting capacity. To apply contactors in power systems that have available fault currents greater than the interrupting capacity of a contactor, it is necessary to protect the contactor from damage by backing it up with a series device that is sufficiently fast acting to interrupt fault currents prior to the contactor opening at all values of current above the interrupting capacity of the contactor. In control gear, back up fuses are used to provide this function. These fuses must also be capable of interrupting the maximum prospective fault current that can flow during a short circuit.

In order to maintain good contactor-fuse coordination, the back up fuse must fully protect the contactor without subjecting the contactor to any time-current zones that may make the contactor vulnerable to damage. Poor contactor-fuse coordination can result if contactor tips open on a fault above their interrupting capacity before the fuse has time to clear since fuses do not have instantaneous trip characteristics. The period of time for a fuse to clear depends on the level of fault current. Optimum contactor-fuse coordination is obtained when the fuse clears a fault just before the contactor tips open. If the contactor tips open before the fuse clears the fault, an arc may continue across the open contact tips until the fuse clears. The arc (in air break contactors) introduces some additional impedance into the circuit that may delay fuse operation.

Conventional air break contactors do not have optimum contactor-fuse coordination for all possible levels of fault current up to the maximum rating of the fuse. However, if the contactor tips are damaged by arcing that occurs when the contactor fails to interrupt the fault current, inspection of the tips and arc interruption mechanisms of the contactor readily reveals any damage and damaged parts can be removed and replaced. For this reason, less than optimum contactor-fuse coordination has been traditionally tolerated with air break contactors.

Vacuum contactors do not lend themselves so easily to visual inspection because the tips are encapsulated in a sealed, evacuated enclosure. Therefore, it is necessary to optimize contactor-fuse coordination to prevent arcing after the tips part during a fault. Contactor-fuse coordination for vacuum contactors can be improved by providing contactors with a higher current interruption rating so that conventional fuses coordinate with or protect the contactor at high fault currents. Alternatively, fuses with faster fault clearing times at lower current levels could be used. However, neither of these solutions are economically viable and, in some cases, physically practical since the higher ratings require larger devices.

Although vacuum contactors are well suited for handling the switching duty of large motors, transformers and capacitors, they have developed a reputation of causing damaging transient overvoltages, particularly when the load is switched off. Current chopping is an abrupt discontinuity of the load current that occurs at contactor opening causing an overvoltage due to the inductive "kickback" that occurs when current in an inductor is suddenly interrupted. The magnitude of this transient voltage depends on the expression $L(di_c/dt)$, where $i_c$ is the magnitude of the "chopped" current.

Vacuum interrupters also can generate damaging transient overvoltages when re-ignitions occur as the tips part. Under certain conditions virtual current chop occurs producing even more severe overvoltages. A combination of surge arresters and surge capacitors located at the motor helps control these overvoltages but are bulky and costly.

Repetitive re-ignitions have been found to be a more potentially damaging source of transient overvoltages in vacuum interrupters than current chop due to both magnitude and frequency of transients. Repetitive re-ignitions may occur if the contacts of a vacuum interrupter part just before or just after a power frequency (natural) current zero, creating a condition known as "small arc angle" opening. When the contacts of an interrupter part, an arc continues to bridge the gap between the open tips and allows current conduction until near current zero. At some point the arc becomes unstable due to lower arc energy as the current approaches zero. This causes a lack of ions in the interrupter tip gap and the arc suddenly stops. The vacuum interrupter quickly recovers its dielectric strength, the arcing stops and the current ceases to flow. If the arc is extinguished while the contacts have a very small separation, the normal system transient recovery voltage will be impressed across this small contact gap thereby increasing the likelihood that a re-ignition will occur. High frequency AC currents are then triggered by re-ignitions. Vacuum interrupters can interrupt these high frequency currents, causing higher transient recovery voltages and subsequent re-ignitions that increase in magnitude as the contact tips continue to part and the dielectric strength between the tips increases.

It is an object of the present invention to provide an improved control system for an electromechanical contractor.

It is another object of the present invention to provide a contactor control system which minimizes the opportunity for contactor tip damage under fault current conditions.

It is a still further object of the present invention to provide a contactor control system which minimizes the opportunity for insulation damage due to multiple re-ignitions.

SUMMARY OF THE INVENTION

The above and other objects, features and advantages are attained in a microprocessor based control system which protects an electrically held vacuum contactor from damage due to tip arcing that can occur if the contactor is opened during short circuit conditions in which fault currents greater than the contactor interrupting capacity are flowing. By inhibiting the release of the contactor during fault conditions, a back up device, such as a fuse, can operate and clear the fault level current before the contactor opens. A means for maintaining control of the contactor through severe system and control voltage dips caused by these faults is also provided. The control system also incorporates a point-on-wave controller to control overvoltages by avoiding small arc angle contactor tip openings in which re-ignitions and virtual current chop are triggered. A method of accurate point-on-wave control has been developed using the coil kickback or flyback voltage that occurs during opening. Information is contained in this voltage waveform which allows close approximation of the actual tip parting event, and this information can be used to correct later contactor switch off operations so that these overvoltages are controlled.

In one embodiment as applied to a three phase power system, the inventive contactor control system (CCM) electronically monitors two or more phases of the load current and, if the current reaches a fault level that the contactor alone cannot interrupt, the control will override any stop commands so that the contactor will not release (or open). This prevents the contactor from attempting to interrupt fault currents. After a back up fuse clears the fault, the contactor can then open without having to interrupt current. The only requirement is that the vacuum contactor, while in the closed position, be able to withstand the peak let-through currents that the back up fuse will conduct. Vacuum contactor interrupters have a much higher momentary current withstand capability in the closed position than interruption capacity. Thus, by holding the contactor closed during a fault it will not be damaged by prolonged tip arcing that occurs if a slow clearing back up fuse is used.

The CCM is also used to control re-ignitions and subsequent virtual current chop phenomenon when vacuum interrupters are switched off by controlling the opening of the contactor so that contact tips part on the sinusoidal phase current waveform well ahead of a natural current zero. This allows the arc to dwell between the opening tips long enough for them to part several mils. When the arc finally extinguishes near a current zero a wide tip gap of 20 to 30 mils insures a high dielectric strength and re-ignition possibilities are thus greatly reduced.

The method used is to monitor the current in one of the motor phases, e.g., phase A, and the contactor coil current. By monitoring the phase A current zero crossings, power can be interrupted to the contactor coil in such a way that the tips part at a desired point on the sinusoidal waveform. The CMM waits for a calculated elapsed time, or interval, after a phase A current zero crossing and then removes the contactor coil power. The delay interval can be calculated to cause tip parting at the desired point-on-wave.

DESCRIPTION OF THE DRAWINGS

For a better understanding of the present invention, reference may be had to the following detailed description taken in conjunction with the accompanying in which.

Figure 7:
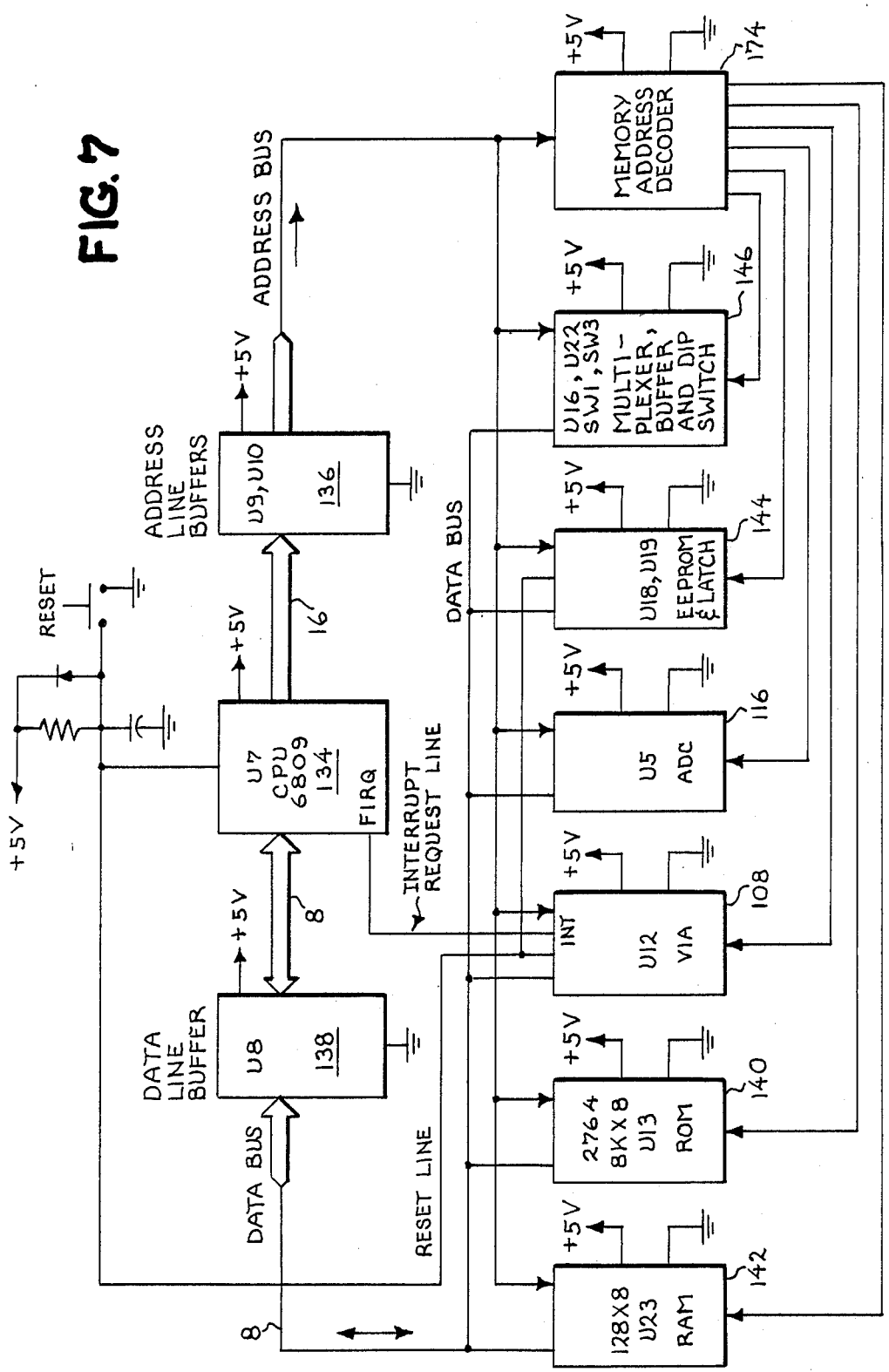
FIG. 7 is a block diagram of the central processor or microcomputer in which the control features of the present invention are implemented.
Figure 8:
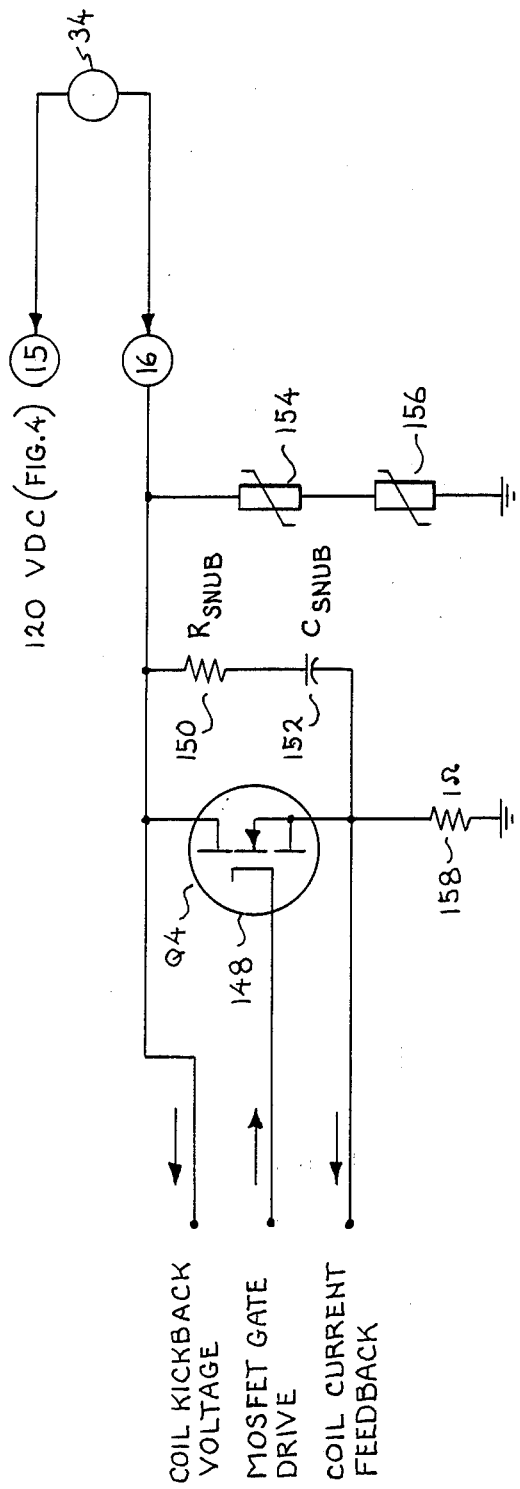
FIG. 8 is a simplified schematic of the power MOSFET switch circuit for regulating coil current.
Figure 10:
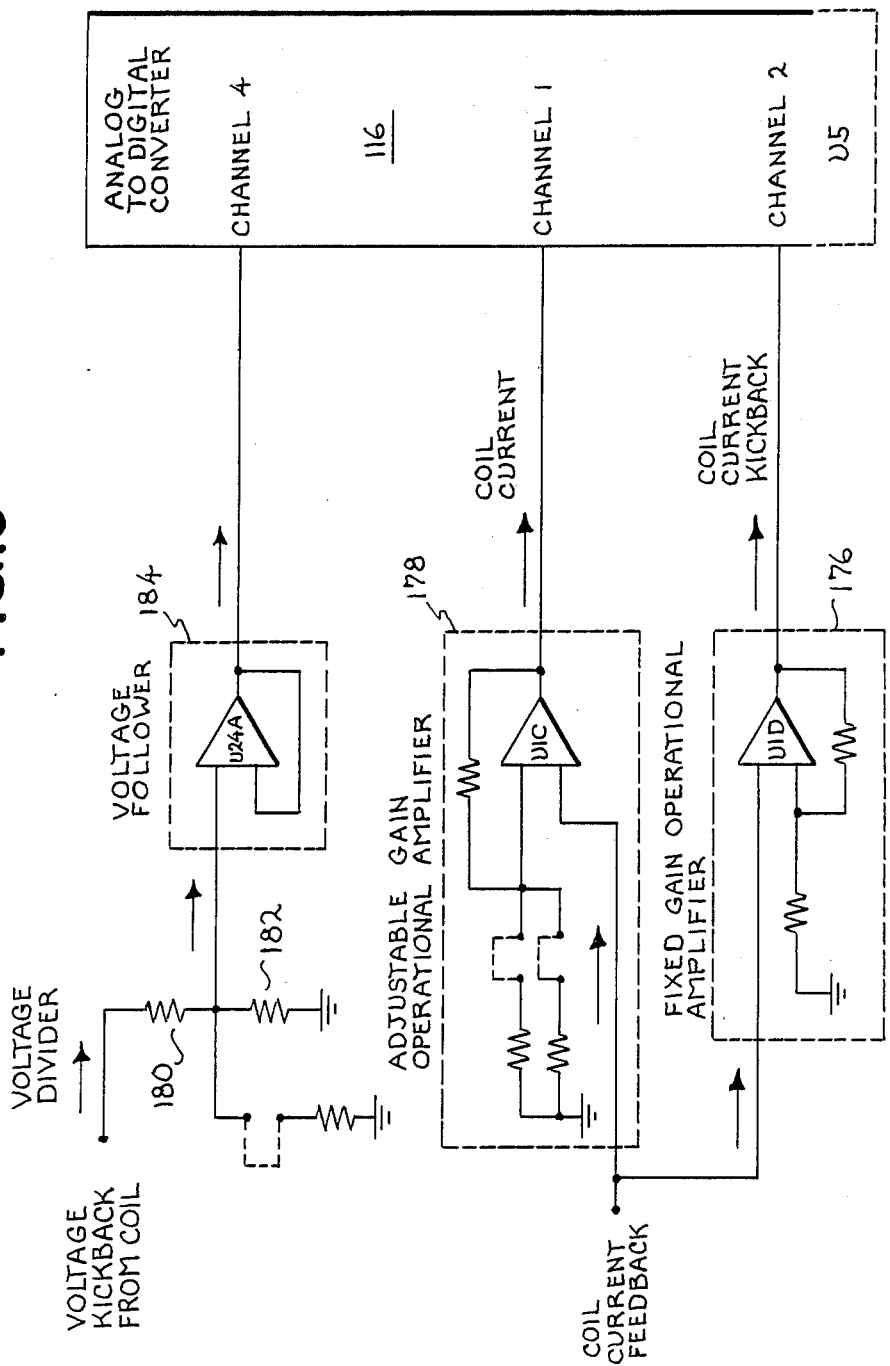
Figure 11:
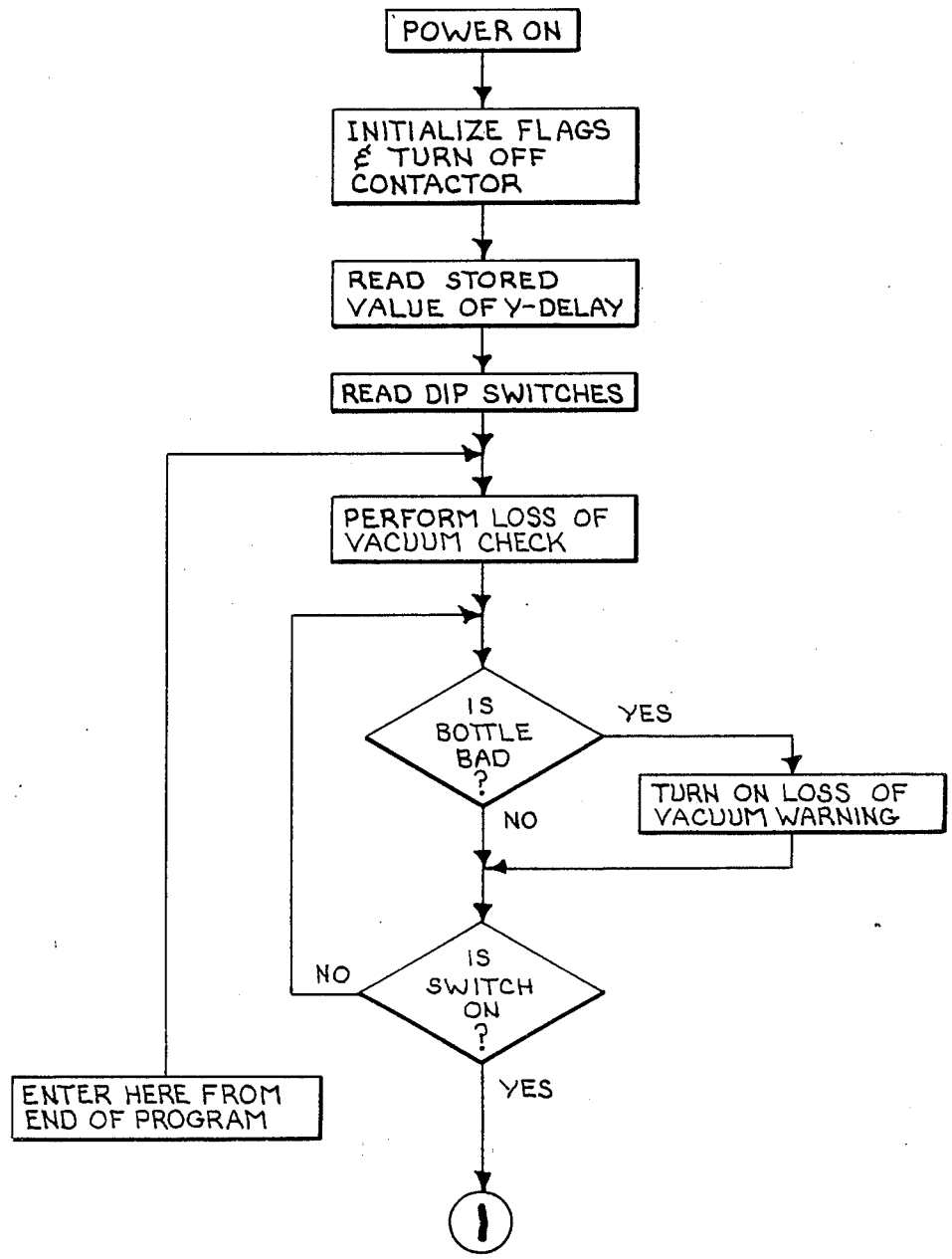
Figure 12:
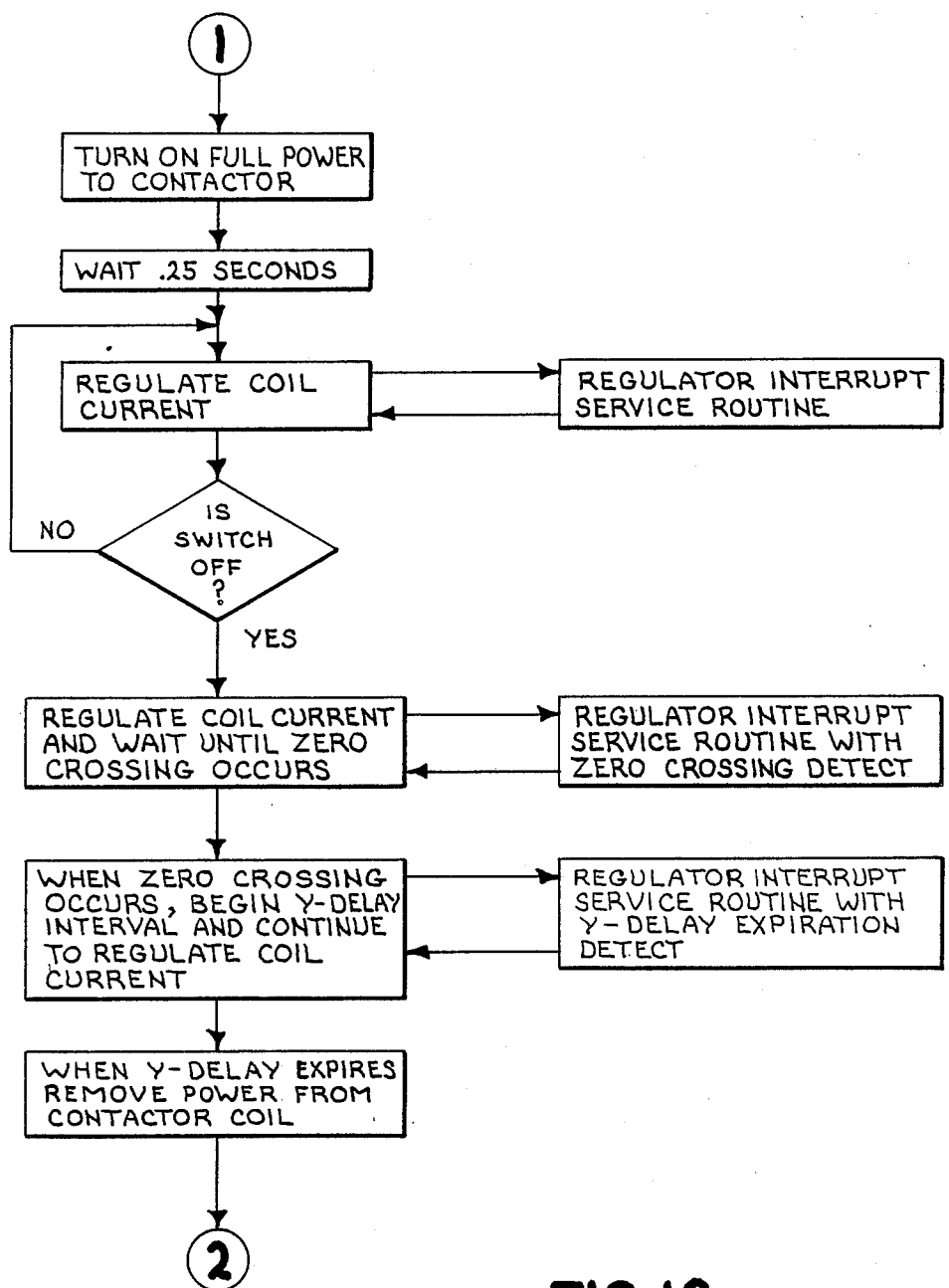
Figure 13:
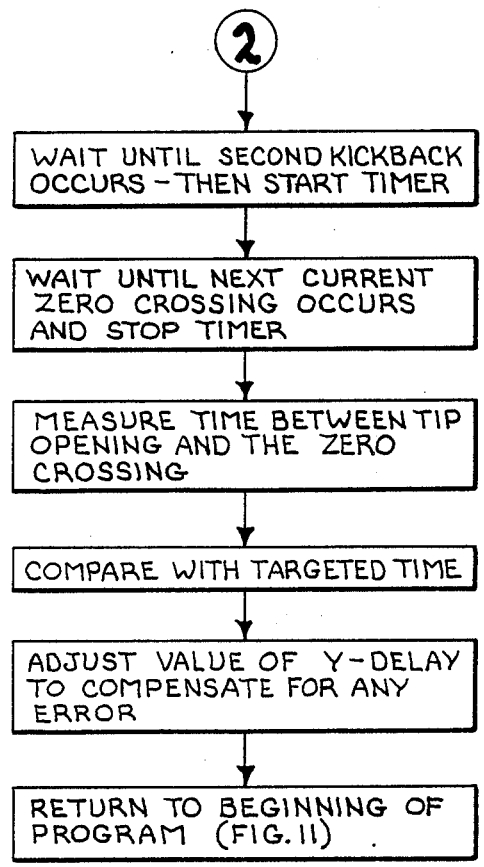

FIG. a simplified diagram of the gate driver circuit for switch of FIG. 8;

FIG. 10 illustrates the analog signal monitoring circuits for controlling contactor coil excitation;

FIGS. 11-13 represent flow charts for the central processor of FIG. 7 for implementing the present invention.

DESCRIPTION OF THE PREFERRED EMBODIMENT

Before turning to a description of the drawing figures, some general observations concerning the requirements of a contactor control are necessary. The time period in which a contactor is held closed after a fault current signal should be limited to a fixed period of time. If a back up fuse has not operated in the fixed period, it can be assumed that a malfunction has occurred in either the back up fuse or the control. It is not prudent to keep the contactor closed indefinitely if an external stop command has been given. A time period of 5 seconds is sufficient time for the fuses to clear a fault. Furthermore, the contactor control (CCM) must be capable of operating if the control voltage dips severely. It is very probable that if an arcing fault develops between phases at a load, the system voltage, and hence the control voltage to the CCM, will dip severely. In fact, it is expected that the system fault voltage may only be about 20 percent of the normal system voltage. To solve this problem, the CCM must include a wide range coil current regulator, the ability to maintain control function during a severe voltage dip, and the ability to sense fault currents.

A coil current regulator can control the pick up and seal in states of the contactor by applying full current to the contactor coil for a short period of time, e.g. ½ second, and then transition to a lower coil current for hold in. A vacuum contactor coil will require about six times its normal hold current during pick up. The coil current regulator can apply full voltage to the coil and then phase itself back far enough to regulate at the rated hold current. The present invention employs a regulator consisting of a switching transistor (MOSFET) that is first turned on continuously to develop maximum pick up current and then is phased back, or its duty cycle is reduced, to develop the needed holding current for the coil. Since the duty cycle is reduced, the average current in the coil is reduced to the needed holding level; however, the actual voltage applied to the coil is equal to the full voltage available at the control circuit. This provides a large margin to allow the regulator to increase the duty cycle of the transistor when low voltage conditions occur. This feature allows the coil current to remain high enough for the contactor to be held in when the system voltage dips severely. In the disclosed embodiment, the control voltage could dip to 17 percent of normal voltage before the regulation reserve is used up. Further, the contactor will hold in down to about one-half the normal hold current so that even after the coil regulator saturates at 17 percent voltage, the system voltage can go down to 8.5 percent before the contactor would start to open. Simple arcing faults probably do not dip system voltages to this level. To experience voltages this low, it would be necessary for the system to sustain a rare "bolted" fault.

In addition to having a wide range coil current regulator the CCM (which will be regulating coil current) must remain functional when the control power voltage dips. One solution to this problem is to employ a switching regulator for the microprocessor based CCM power supply which will function even if the control voltage dips to 30-40 percent of normal. A storage capacitor is also useful on the input side of the switching regulator to store enough energy to supply power for the CCM for a period of about three seconds after a complete loss of control power. This interval will allow control of the contactor until the back up fuse clears. Thus, even in the case of a bolted fault in which there is a complete system voltage collapse, the CCM can function for this interval to sense the decreasing coil current and cause the regulation transistor to saturate full on so that the coil can be held in.

Normal three phase industrial power systems operating in the range of 2 KV to 15 KV employ resistance grounded feeds. A few are high resistance and even fewer are ungrounded. For these types of systems, it is only necessary to monitor any two of the three phases feeding the load in order to provide optimum contactor-fuse coordination for all three contactor poles. If a ground fault occurs, it will not develop short circuit levels of current because the return ground impedance to the power system feed will limit ground currents to well within the interrupting capacity of the contactor. Thus, if a ground develops at the load on the unmonitored phase, the contactor will not be endangered if it is forced to interrupt this ground current. Solidly grounded systems are extremely rare at these voltages; however, it will be necessary to monitor all three phases for solidly grounded systems because this type of ground fault can reach short circuit levels. Phase to phase faults will always involve at least two phases so two phase monitoring will suffice for contactor protection.

Figure 1:
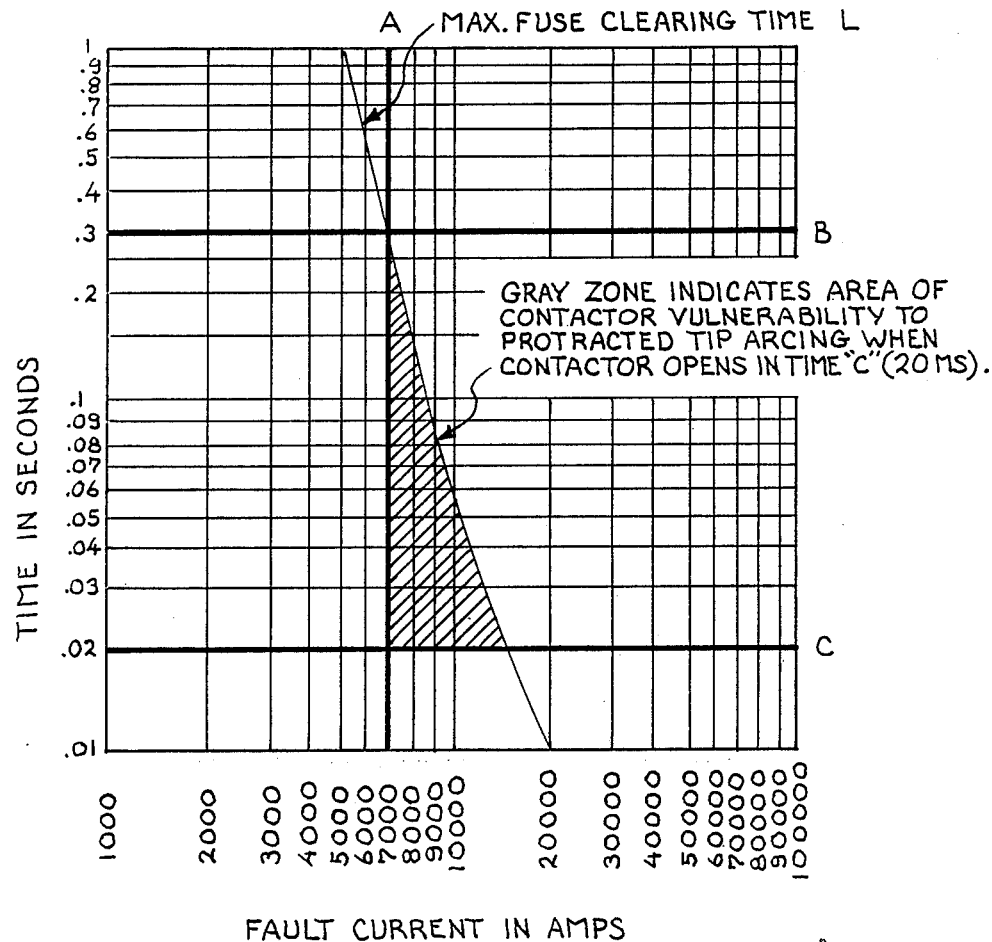
FIG. 1 is a graph of fault current as a function of time illustrating fault clearing time and safe areas of contactor operation in a typical contactor and fuse system.

The CCM interfaces with current transformers in two phases that feed the load. These current transformers have a rated five ampere secondary. Primary ampere ratings will range from 10 to 1000 amperes depending on the load. Current transformers are chosen to give from 50 to 80 percent of the current transformer rated output when the load is at its rated capacity. This will mean that the secondary current will fall in the range of 2.5 to 4.0 amperes when the load is at its rated current. Applying a 500:5 ratio current transformer to a 400 ampere rated motor will give a transformer secondary current of 4.0 amperes. Maximum inrush current for this size motor should be no more than seven times rated load or 28.0 amperes in the current transformer secondary. Contactor interrupting capability is considered to be 7000 amperes (70 amperes in the current transformer secondary). Accordingly, the CCM must prevent the contactor from opening if the current transformer secondary current is 70 amperes or greater. In fact, it is desirable that the contactor be inhibited from opening if the current is considerably less than 70 amperes to provide a margin of safety. If the release inhibit threshold is set at 40 amperes, this gives a 43 percent margin above the motor inrush current and a 75 percent margin above the 40 ampere inhibit level for the 70 ampere interruption rating of the contactor. FIG. 1 illustrates the areas of optimum and poor contactor-fuse coordination in a system using the values described above. This Figure plots time versus fault current with line L indicating the maximum fuse clearing time for different current values. If the contactor tips open before 0.3 seconds, the area between rated interrupting capability (7000 amperes) and line 10 represents a gray zone in which tip arcing may occur.

Another potential problem that occurs with vacuum interrupters is a phenomenon known as multiple re-ignitions during tip opening. One solution to this problem is to open the contactor tips at a certain point on the current waveform during every interruption. This requires that the contactor maintain a constant drop-out time after coil power is removed. Precise tip-opening timing will allow the tips to be fully opened when a current zero occurs. allowing maximum dielectric strength between the tips to develop and thereby prevent multiple re-ignitions.

A problem encountered with this approach is that the contactor drop out times are not sufficiently consistent between contactors to allow for a fixed time between the removal of coil power and actual tip parting (contactor opening time). Also a given contactor may develop long term drift in the time it takes to open due to wear or other factors. Therefore, it becomes necessary to develop some feedback mechanism that will enable the CCM to correct for drifting contactor opening times. Thus, if a given contactor opening time was such that the targeted point-on-wave was missed, the next switch off must be corrected in that the Y-delay interval, i.e., the interval between a detected zero crossing and coil power removal, must be modified to correct for the error that was detected. This is based on the fact that successive contactor opening times for a given contactor will be consistent enough for tip partings to fall within the targeted point-on-wave band if proper corrections are made from the previous switch off operation. Laboratory tests have verified this approach is successful as long as the coil current is regulated at a consistent value.

To implement correction of the Y-delay interval requires a feedback mechanism that can be used to correct subsequent contactor switch off operations. The actual point in time that the contactor electrodes (or tips) part is an event that is not easily measurable. Without knowledge of when the tips actually part, no feedback can be obtained to be used to calculate the correction factor. However, after coil power is removed, as the armature unseals and moves open, the rate of decay of magnetic flux in the armature magnetic circuit will be greatly accelerated as an air gap is introduced into the magnetic circuit, causing an abrupt increase in the reluctance of the magnetic circuit. This increased reluctance, and the subsequent accelerated rate of magnetic flux decay, will induce a negative voltage across the open terminals of the contactor coil according to Faraday's law for induced voltages. This induced voltage will be referred to as the "coil flyback voltage".

Figure 2:
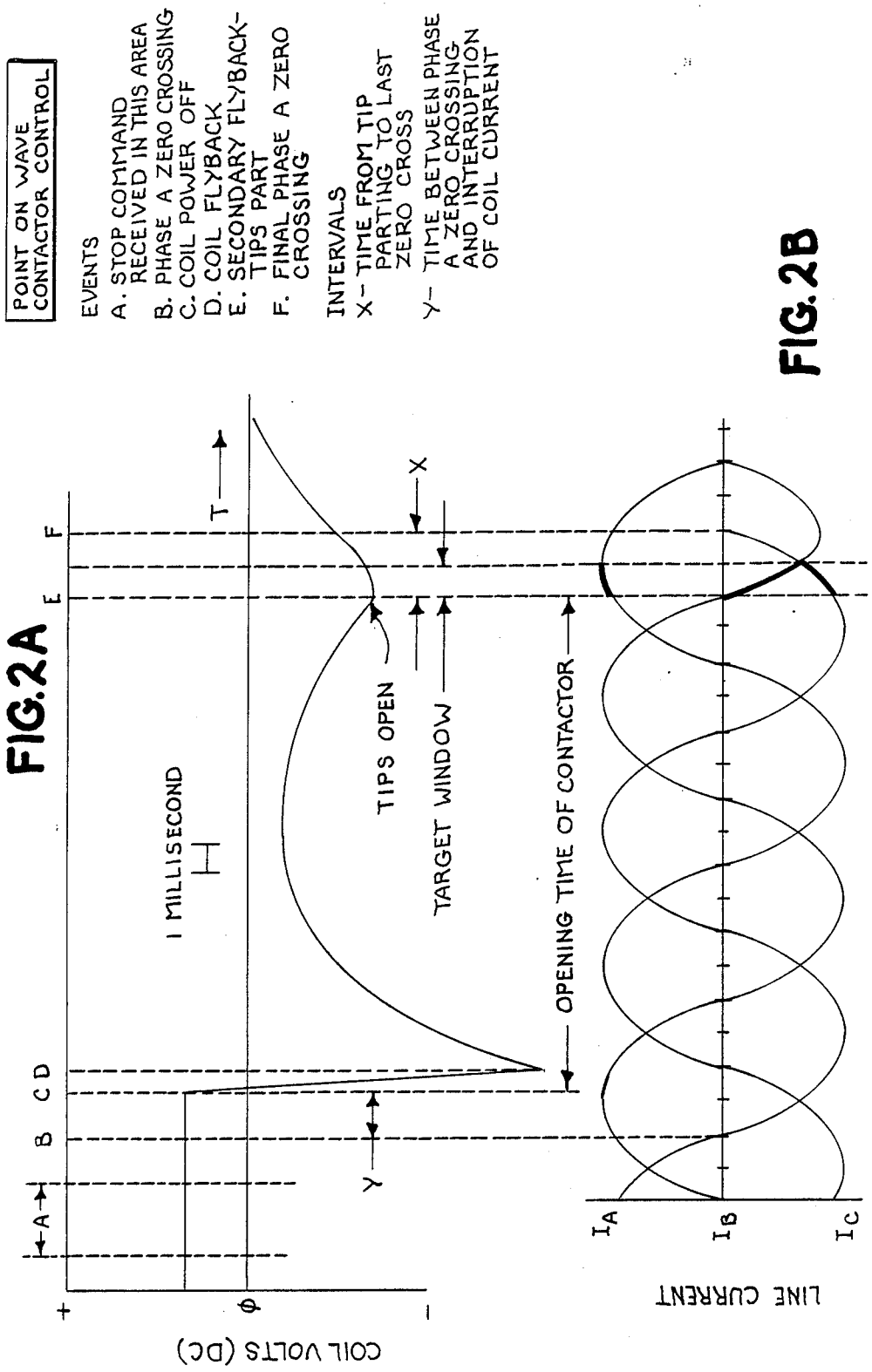
FIG. 2A is a graph of coil voltage as a function of time for a typical contactor.
FIG. 2B illustrates three phase power waveforms coordinated with the graph of FIG. 2A.

The convenient feature of this flyback voltage is that it occurs very near to the actual tip parting event. In fact, a small secondary peak occurs during opening that is within a few hundred microseconds of the actual tip parting. Although the voltage peak is discussed here, a current peak may also be utilized. Referring now to FIG. 2A, there is shown a graph of coil voltage as a function of time for a typical electromechanical contactor. FIG. 2B illustrates a set of three phase alternating current waveforms indicative of current through the contactor tips. During interval A, an interrupt command is received by the CCM. The CCM latches this command until the next zero-crossing of the IA waveform. The Y-delay interval is then measured from that zero-crossing (time B) and power removed from the contactor coil at time C. The coil voltage immediately begins reversing as the inductance of the coil attempts to maintain current flow in the coil, reaching a first peak at time D. The coil voltage then begins to decay until the contactor tips begin to open. Actual tip parting occurs at about time E characterized by a second peak in the waveform. It will be noted that several cycles of the 60 Hz. waveform may occur between removal of coil power and tip opening. The target zone for tip opening is such that the current $I_A$ has not reached zero and is also not about to reach zero, but has passed through a peak. This will allow the tips to open fully before a current zero occurs so that re-ignition of an arc is unlikely, particularly since the tips will be several mils apart before the transient recovery voltage waveform begins increasing.

Since the purpose of the point-on-wave control is to avoid small arc angle openings, by properly controlling the point-on-wave of phase A tip parting (called phase A's K-point), the other two phases can be caused to open so that they also avoid the small arc angle opening. A target range has been identified for tip openings in the area of 21 to 55 electrical degrees before a phase A current zero for 60 Hz systems, although 30 to 55 electrical degrees is more appropriate for commercially available circuit breakers since the small phase angle requires much faster operation. Proper adjustment of phase B and phase C K-points will insure that they do not have small arc angle openings as well. At a constant opening speed of 15 inches per second, the phase A tips will part no sooner than 1.4 milliseconds before a current zero. When the current stops at or near the natural current zero, the gap will have widened to 21 mils, creating a very high dielectric strength, and consequently, high resistance to re-ignitions. The term "positive time interval" is used herein to refer to time intervals prior to or subsequent to zero crossings of the current wave form in the sense described above, i.e., non-zero time intervals.

Figure 3:
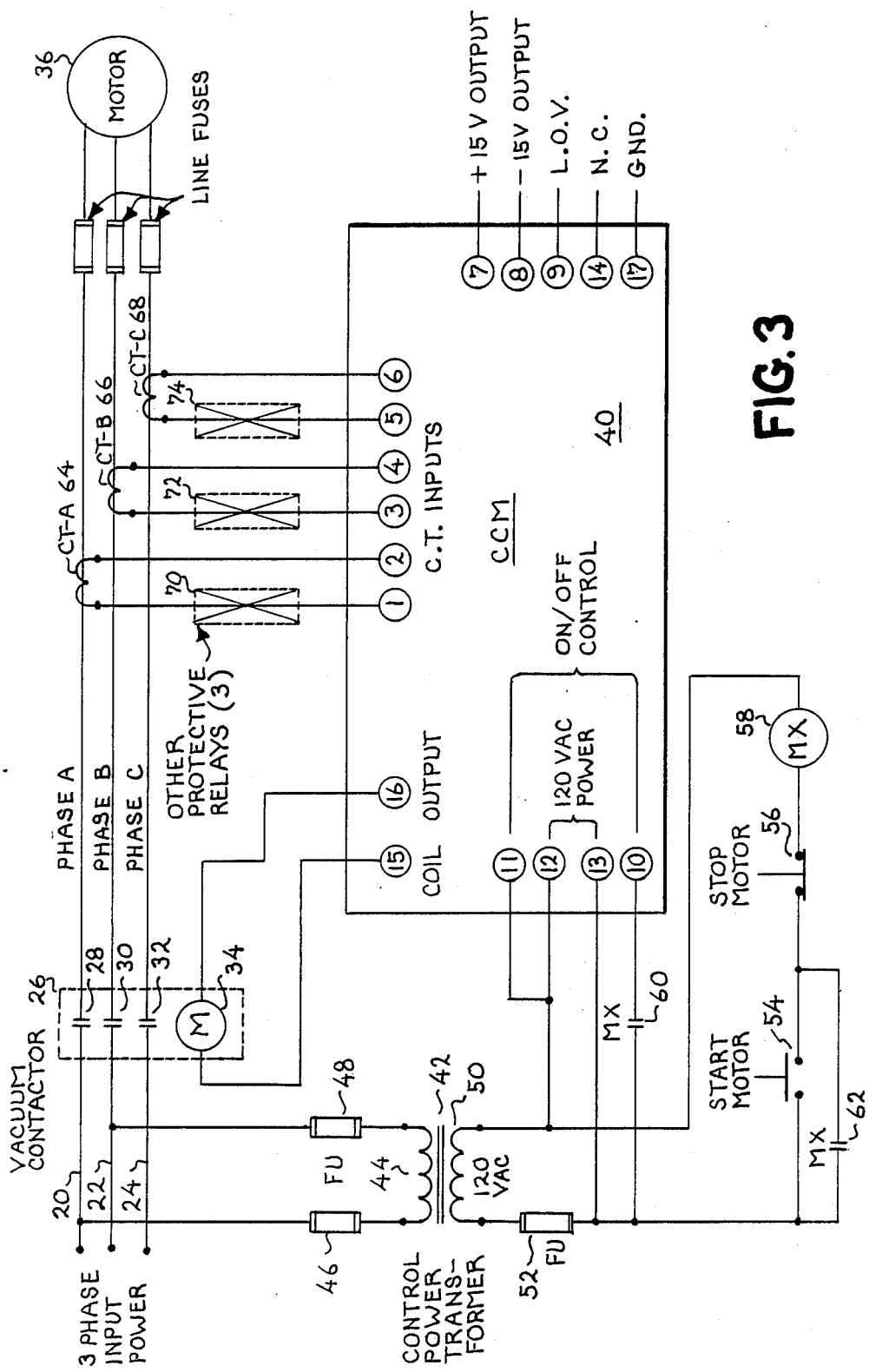
FIG. 3 a simplified electrical diagram of a motor control system incorporating an electromechanical contactor controlled in accordance with the present invention.

Referring now to FIG. 3, there is shown a simplified electrical diagram of a motor control system incorporating an electromechanical contactor controlled by a contactor control system (CCM) of the present invention. Three phase alternating current is supplied via lines 20, 22 and 24 to a vacuum contactor 26 having three sets of contact tips 28, 30 and 32. Closure of the tips is effected by an electrically actuated coil 34. When the tips 28, 30 and 32 are closed, current is supplied along the lines marked phase A, phase B and phase C to a load shown as an AC motor 36.

The coil 34 is powered and controlled by CCM 40. Power for CCM 40 is derived from a control power transformer 42 having a primary winding 44 connected between lines 20 and 22. Fuses 46 and 48 may be connected in series with the winding 44. A secondary winding 50 steps the transformer primary voltage to a level appropriate for application to CCM 40, e.g., 120 volts. The secondary winding 50 also includes a fuse 52. A normally open motor start switch 54 and a normally closed motor stop switch 56 are serially connected in circuit with winding 50 along with a motor contactor coil 58. The coil 58 controls a set of normally open contact tips 60 which provide a signal to CCM 40 indicative of whether the motor 36 is to be started or stopped. The coil 58 also controls contact tips 62 which bypass motor start switch 54 to maintain the circuit in a closed condition when switch 54 is released.

The CCM 40 monitors the currents in lines phase A, phase B and phase C by means of corresponding current transformers 64, 66 and 68. The connecting links from the current transformers may include other protective relays or overcurrent devices indicated at 70, 72 and 74.

Before describing the details of CCM 40, the following discussion will be directed to the overall features and functions provided by the present invention and implemented in CCM 40. As will be appreciated, the CCM 40 is a microprocessor based control and includes volatile memory (RAM), non-volatile memory (ROM), a central processing unit (CPU), analog to digital (A/D) convertors and various interface adaptor circuits When the CCM 40 is first powered up, a value for the Y-delay internal is read from EEPROM into an appropriate RAM. The initial interval is a value, determined by previous contactor openings.

After the CCM receives a stop command, it waits for a phase A zero crossing When the crossing occurs, it begins the Y-delay interval When the delay expires, power is removed from the coil 34. At this point, the coil voltage surges in the negative direction as the inductance tries to maintain current flow through itself as shown in FIG. 2A. After an initial peak, the voltage begins to decay exponentially until the armature starts to unseal. Several milliseconds after the coil current is interrupted, the CCM 40 begins sampling the coil voltage at approximately one sample every 200 microseconds. Adjacent coil voltage samples are compared with each other until the tip opening peak is detected. When the peak is detected, internal time measurement commences. This time interval is the "X" interval shown in FIG. 2A, and is equal to the time between tip opening and the next current zero. The measured value of "X" is subtracted from the setpoint value for the K-point and an error value is generated. The error value is stored in memory and is then used to adjust the value of Y-delay that will be used for the next contactor opening. This correction activity will continue with each switch off operation to compensate for any drift in the contractor 26 opening time.

Temperature fluctuations will cause the resistance of contactor coil 34 to vary. The resistance of a hot coil may be as much as 30 to 40 percent higher than a cold coil. This factor, plus variations in the system control voltage will cause variations in coil current which will have an affect on the repeatability of the opening time of the contractor. This is due to the fact that the armature flux density resulting from reduced coil current may be considerably less than the flux density at normal coil current. Thus, the time after coil current interruption that it takes for the armature flux density to decay to a level at which the armature unseals may vary. This problem is controlled by regulation of coil current. Constant coil current will maintain a constant NI (ampere-turns) in the magnetic circuit of the armature. This will insure that the stored magnetic energy, and hence contactor drop out time, will be acceptably repeatable for a given contactor, regardless of coil resistance.

CCM 40 directly controls phase A contact parting (K-point). Phases B and C K-points are controlled indirectly. Ideally, the three tips should be set to part simultaneously. In reality however, manufacturing tolerances and unequal tip wear cannot guarantee this. The manufacturing tolerance specifications can be set so that the two poles that do not have direct point-on-wave K-point control are set to open somewhat later than the phase A contact tips.

It can be seen from FIG. 2B that phases B and C have current extinctions that occur after phase A. Consequently, to avoid small arc angle openings in phases B and C, it is not critical that the K-points of phases B and C occur within the targeted zone of phase A. However, it is critical that B and C phases not have K-points before phase A's K-point. Therefore, the contactor must be adjusted so that phases B and C open in the range of 5 to 20 electrical degrees after phase A. At a tip opening speed of 15 inches per second, this relates to a contact offset of from 3.5 to 14 mils. This tolerance range is a manageable manufacturing specification. CCM 40 is not sensitive to phase rotation so long as the contactor tips are set to open per the above manufacturing tolerance.

Repeated polarized interruption of phase currents, in which arcing currents always flow in the same direction, causes undue build-up of electrode material on one tip of a contactor tip pair and depletion of material from the other. Point-on-wave controllers inherently cause polarized arcing unless special controls are used. The feature of alternating between positive going and negative going zero crossings for keying the Y-delay timing interval is provided by CCM 40. If, during a previous switch-off, the Y-delay interval was begun on a positive going current zero, the next switch-off operation will be keyed to a negative going crossing. CCM 40 stores in RAM the polarity that is to be used for the next zero crossing point.

When motors or transformers are operating at light or no load conditions, not only do the phase currents become very small, but the waveform may become distorted due to excitation current effects which become more dominant. These non-linear effects contain high harmonic content which distort the normal sinusoidal waveform so that false zero crossings occur which can cause misoperation of the control. The CCM 40 compensates for erratic crossings by verifying that the current transformer 64 secondary current is above a certain minimum level. If the current is below this established level, then CCM 40 will still attempt to open the contactor at the proper point-on-wave, but the correction calculation to the value of Y-delay will be omitted. The existing value of Y-delay will be used for the next switch-off operation. It should be noted, however, that there is no significant concern over re-ignition during motor switching under light load conditions. Re-ignitions are most probable when the vacuum interruptor 26 opens when motor currents are at or near locked rotor levels. This occurs when the interruptor 26 opens before the motor has fully accelerated or if the motor is stalled! The operation of CCM 40 under light load conditions without Y-delay correction will not create problems with transient overvoltages.

A three amp chop (maximum) vacuum interruptor may chop or force a current zero a short time before a natural current zero. This could be a problem since CCM 40 is measuring the time to the last current zero and using this value as the "X" interval in its calculations. If chopping occurs, the interval "X" may be improperly measured and consequently, the new Y-delay interval will be improperly calculated. This is not a problem if chop levels are consistent. The chop level could simply be compensated for. However, current chop levels are unpredictable within a given range. For a vacuum interruptor with an average chop of 1.5 amperes and a maximum chop of 3 amperes, it can be calculated that the "X" interval measurement error will be less than 0.2 milliseconds based on a premature current zero from a 3 ampere chop at 25 amperes RMS. By far, most motors that will be applied with medium voltage contactors will have full load currents greater than 25 amperes. Accordingly, it is not expected that a current chop will affect operation of the invention under normal operating conditions. However, if it is necessary to use the invention with load currents of less than 25 amperes, the chop problem can be minimized by using interruptors with a one ampere maximum chop rating.

CCM 40 as shown in FIG. 3 consists of several basic building blocks. These blocks are as follows:
1. Power Supply
2. Line current rectifiers and zero crossing detector
3. Start/Stop Switch Buffer
4. Central Processor
5. Memory-ROM, RAM and EEPROM
6. Parallel Interfaces
7. Analog to Digital Interfaces
8. Digital to Analog Interfaces
9. Power Mosfet Switch Each of these building blocks will be described individually in the following discussion.

1. Power Supply

Figure 4:
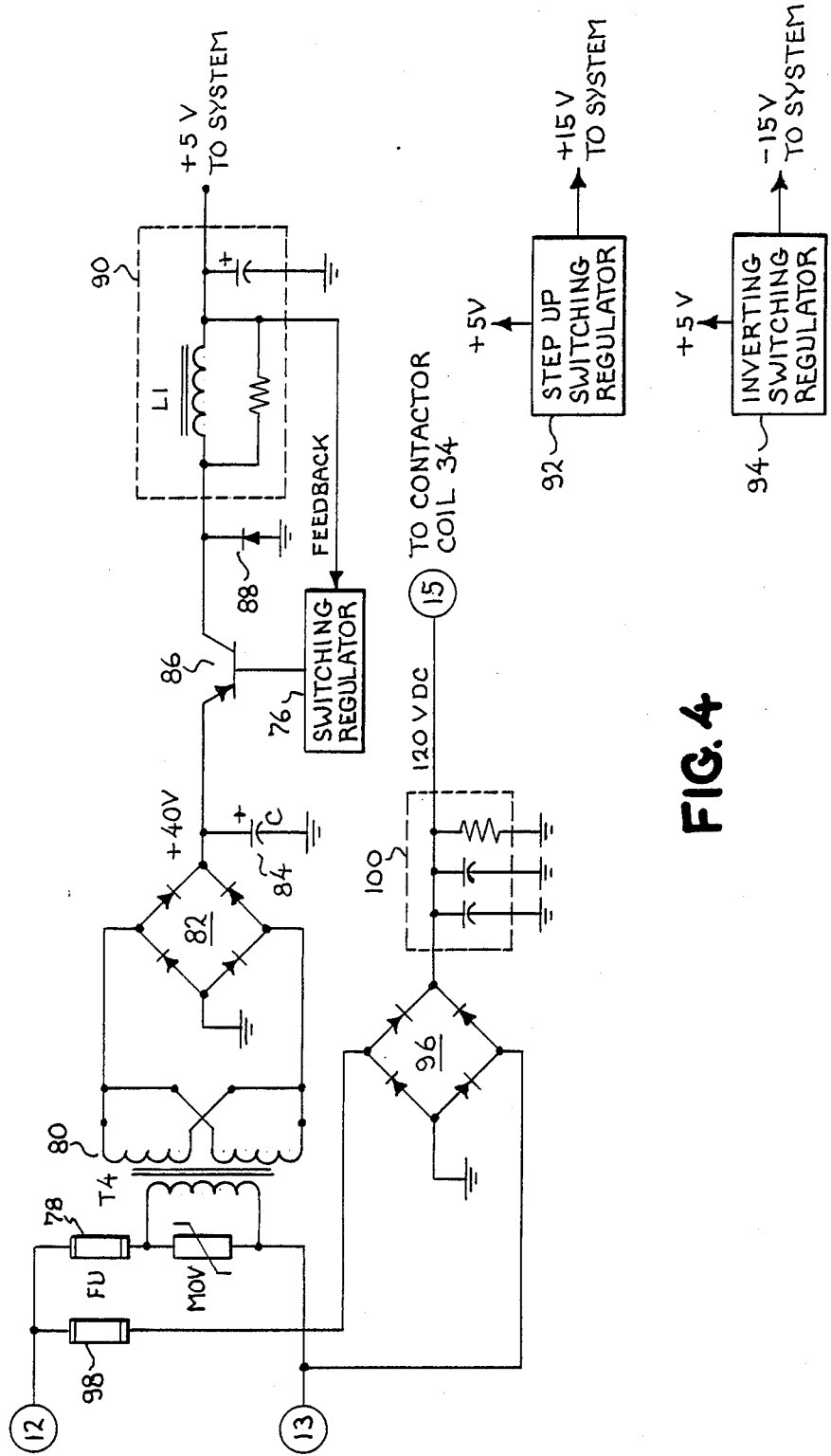
FIG. 4 is a simplified schematic of a power supply for use with the present invention.

The power supply for CCM 40 is shown in FIG. 4 and consists of essentially three switching regulators of a type well known in the art. A first switching regulator 76 is utilized to develop a five volt direct current reference. The input terminals labelled 12 and 13 correspond to the input terminals 12 and 13 shown in FIG. 3 which are connected to the secondary winding 50 of control transformer 42. These input terminals are connected through a fuse 78 to a primary winding of a step down transformer 80. The transformer 80 has a pair of split secondary windings each of which are connected in parallel with each other in order to supply approximately 40 volts DC at the output of a full wave bridge rectifier 82. A filter capacitor 84 is connected across the output of the rectifier and is utilized to store a large amount of charge so that the microprocessor in the CCM 40 will have sufficient power to continue operating for about three seconds after a total power failure. In this regard, the capacitor 84 may have a value in the area of 16,000 microfarads. The voltage at the output of the rectifier 82 is maintained at about 40 volts so that the regulator circuit can maintain system power through severe voltage dips on the 120 volt alternating current main supply lines. The regulated five volt output is developed by a switching transistor 86 which is modulated by the switching regulator 76. A catch diode 88 connected between the collector of the transistor 86 and ground serves to allow current to flow through an inductive load while transistor 86 is off. An LC filter 90 provides energy storage and the filtering for the chopped DC coming through transistor 86.

The remaining two switching regulators 92 and 94 provide the plus and minus volts respectively to operate various integrated circuits that require these voltages within the CCM 40. Each of these regulators derive their power from the five volt bus voltage developed at the output of filter circuit 90. Since the five volt supply is designed to withstand severe voltage dips, the input of the 15 volt regulators remains constant; thus, the entire system will operate during system voltage dips of the type that can occur during power system faults. The regulators 92 and 94 are well known switching regulators which utilize high frequency switching and transformer techniques to step the five volt DC voltage up to the required plus and minus 15 volts. The five volt regulator 76 also include circuitry for detecting a low input voltage condition. If a low input voltage is detected, the signal is provided to the CCM central processing unit which may then perform certain special tasks to control a powered shut down before the system power falls too low to allow operation.

The voltage for the contactor coil 34 is provided by a full wave bridge rectifier 96 connected across the power input terminals 12 and 13. The input line to the rectifier 96 also includes a fuse 98. The 120 volts developed at the output of the rectifier 96 is filtered by a RC filter network 100 and it is then coupled directly to one side of the contactor coil 34.

2. Line Current Rectifiers and Zero Crossing Detector

Figure 5:
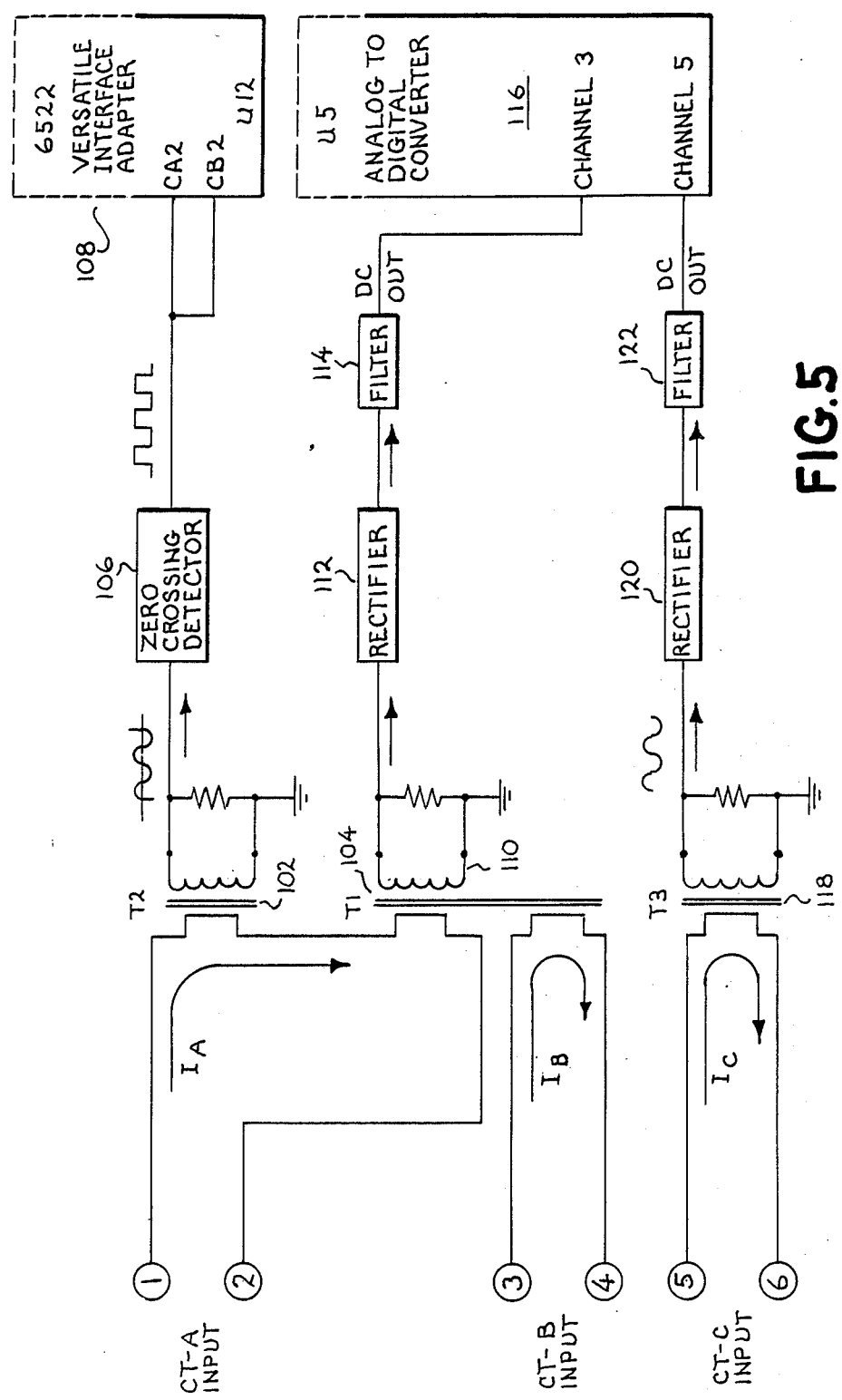
FIG. 5 is a partial schematic and block diagram of line current rectifiers and zero crossing detector forming a part of the present invention.

Referring now to FIG. 5, there is shown a simplified electrical and block diagram of line current rectifiers and a zero crossing detector which are connected to the current transformers 64, 66 and 68. The input terminals 1 and 2 are connected to the secondary winding of the current transformer 64 and provide an indication of the current in the phase A line to the motor load 36. The current $I_A$ generated by current transformer 64 is coupled through a primary winding of a first transformer 102 and also through a primary winding of a second transformer 104. The first transformer includes a secondary coil which is coupled to an input terminal of a zero crossing detector 106. It might be noted here that the transformers 102 and 104 are essentially current to voltage converting transformers. The zero crossing detector 106 thus detects the zero crossing of the current wave form based on its conversion to a voltage wave form. In one form, the zero crossing detector 106 may comprise a high speed comparator having a very high gain and fast switching time. The output of the comparator is a square wave synchronized with the zero crossings of the $I_A$ current. The edges of the square wave are supplied to an appropriate input terminal of a versatile interface adaptor (VIA) 108. The interface adaptor may be for example, a type 6522 available from Rockwell International, Inc. which has the capability of interrupting a central processor under a variety of conditions including detection of an edge on one of the edge detecting inputs.

The current developed in the phase B line is coupled via current transformer 66 to input terminals 3 and 4 of CCM 40 which are connected to a second primary winding of the transformer 104. The value of the phase A and phase B currents are summed magnetically in transformer 104 and coupled through a secondary winding 110 to a rectifier circuit 112. The output of the rectifier circuit 112 is passed through a filter 114 to provide a direct current output. This arrangement provides the system with a method to detect and measure current flowing in the motor circuit since the value of the DC voltage is directly proportional to the current flowing in the secondary of the main line current transformers. This voltage is connected to one input terminal of an analog to digital (A/D) converter 116 so that a digital indication of the value at the line current may be provided. The current transformer 68 is also connected to a current-to-voltage transformer 118 which provides a signal through a rectifier 120 and filter 122 to another input terminal of the A/D converter 116 to also provide a signal indicative of the current flowing in phase C line.

3. Start/Stop Switch Buffer

Figure 6:
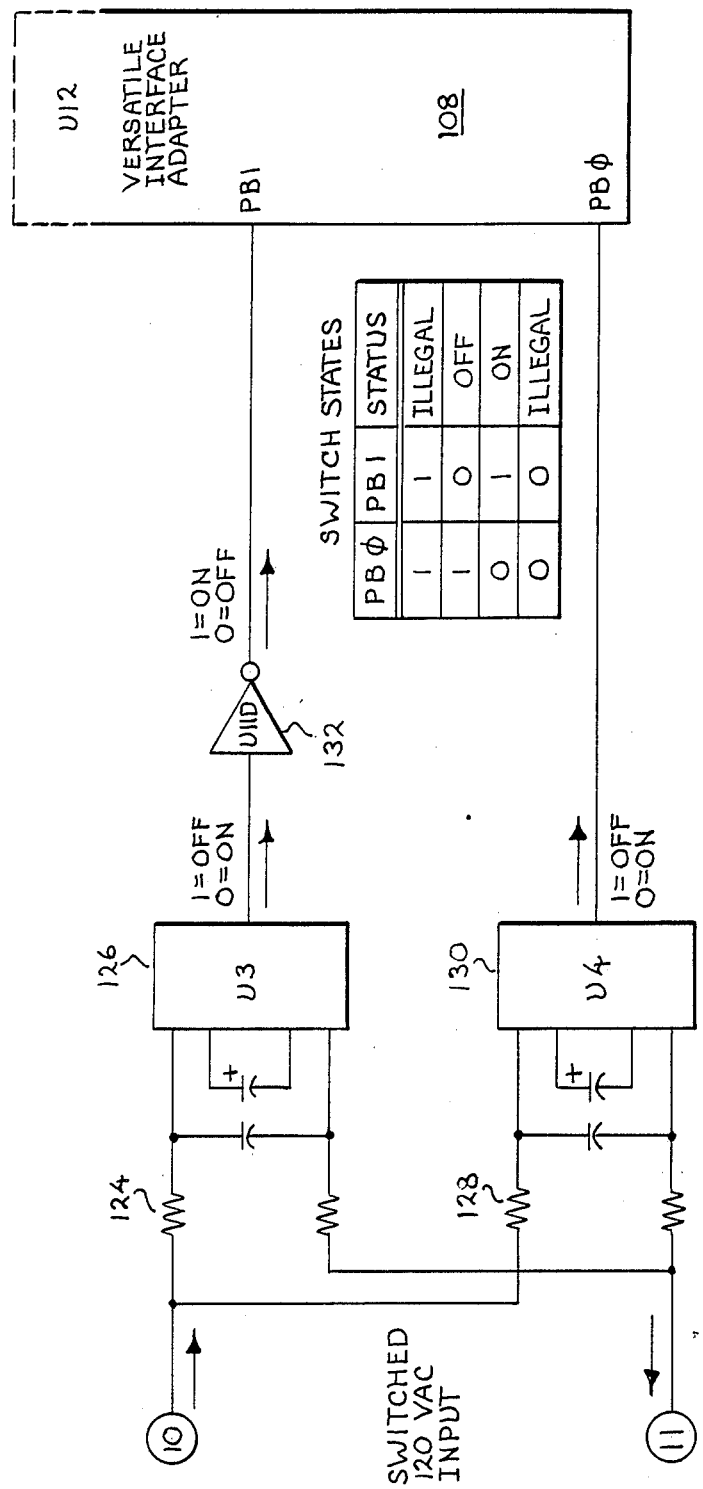
FIG. 6 illustrates a redundant buffer arrangement for the contactor control signals from the start/stop switches.

As was seen in FIG. 3, the start/stop switch is connected through a contact pair 60 to an input terminal 10 of the CCM 40. Referring now to FIG. 6, it can be seen that the start/stop switch is processed through a switch buffer consisting of two opto-isolators 126 and 130 connected to provide signals to appropriate input teminals of the versatile interface adapter 108. The input terminal 10 is connected through a current limiting resistor 124 to a first input terminal of first opto-isolator 126. Input terminal 10 is also connected through a second current limiting resistor 128 to an input terminal of the second opto-isolator 130. Similarly, the input terminal 11 is connected through appropriate current limiting resistors to second input terminals of each of the opto-isolators 126 and 130. The opto-isolators are commercial items of a type well known in the art. The two circuits 126 and 130 are connected in parallel so as to provide a logic state to define the status of the contactor tip pairs 60. In this regard the output of the isolator 126 is connected through an inverter 132 to a first input terminal PB 1 of adapter 108. The output of isolator 130 is connected directly to input terminal PB 0 of adapter 108. In essence, the isolators are redundant and are so provided since a failure of an isolator can be critical as it may cause a motor to continue operation even if a stop command has been sent to the CCM 40. As will be apparent, if the input signals on both PB 1 and PB 0 are of the same logical state, there is an illegal condition which will require the contactor 26 to be shut down. An alarm or warning light may be provided in conjunction with such an event.

4. Central Processor Unit

The central processing unit (CPU) for CCM 40 is preferably a Motorola 6809. The central processor is shown in FIG. 7. CPU 134 is surrounded by address line bus buffer 136 and data line bus buffer 138. The 6809 processor operates at 1 megahertz which is derived from a 4 megahertz crystal in a manner well known in the art. The interrupt lines of the CPU 134 are normally pulled up to 5 volts but the interrupt request line (IRQ) and the fast interrupt request line FIRQ may be operated by the parallel versatile interface adaptor 108 and the power supply regulators 92 and 94 as described above. The central processor also includes a watch dog timer (not shown) which must be reset by the processor at regular intervals or the CPU 134 will indicate a failure and remove power from the vacuum contactor 26. The watch dog timer is also of a type well known in the art and is essentially a missing pulse detector or timer that times out at a fixed interval. If the update pulse is missing the timer times out forcing an interruption of power to the contactor 26.

The system memory consists of three separate elements. A first element is an erasable programmable read only memory (EPROM) type 2764 from Intel Corp. This memory is indicated at 140. In the illustrative embodiment shown in FIG. 7, the system program is stored in EPROM 140 so that data is not lost during times when power is removed. Since a different program may be required for different types of vacuum contactors and for different frequencies of power line currents, several programs may be available within the memory 140.

A second element of the memory is the random access or RAM memory which may be for example a Motorola type 6810 which has 128 bytes of temporary storage available. This memory is shown at 142 and is used for scratch pad or temporary memory and also for the processor system stack. Any values stored in memory 142 will be lost when power is removed. The RAM locations used for variables are initialized to the proper value by the system power up routines that are executed after a power up restart or reset sequence and are determined by the memory unit 140. Such techniques are well known and will not be described herein.

The third element of the system memory is a National Semiconductor type 9306 electronically erasable programmable read only memory (EEPROM) which retains its data during power off conditions but also can be erased and programmed again by the central processor. This memory is shown at 144 and contains 16 locations each of which is 16 bits in length. The memory device 144 requires that data and address commands be sent to it in serial form. The conversion to serial form is handled by the system EEPROM driver software which allows the entire system to store data which can vary from time to time but which needs to be recalled after the system has been shut down. Such data may be, for example, the value of Y delay. An addressable latch circuit (not shown) is included in the EEPROM interface and is used to provide clock and chip select signals to the EEPROM. The data lines for the memory unit 144 are connected to the parallel versatile interface adapter 108.

The parallel interface adapter 108 is a type 6522 which has two 8 byte parallel ports and two internal 16 byte interval timers. The device also has two edge detecting inputs which are connected to the zero crossing detector 106 as shown in FIG. 5. One of the advantages of the interface adaptor 108 is that all of the parallel data lines can be individually configured for either input or output service. One of these lines is used to drive a MOSFET gate driver circuit which regulates the current in the vacuum interrupter coil 34. Other output lines of adaptor 108 are utilized as required to drive the aforementioned watch dog timer, the EEPROM 144, to read the end of conversion flags from the AD converter 116 and to provide a signal in the event of loss of vacuum in the vacuum interrupter 26.

In the central processor arrangement as shown in FIG. 7, the adapter 108 is connected to have the ability to interrupt the central processor 134 under a variety of conditions. For example, the adapter 108 can interrupt the processor 134 if a timer times out (the regulator timer) or if an edge is detected (zero crossing detector) on one of the edge detecting inputs. The interrupt output line of the adaptor 108 is connected to the fast interrupt request (FIRQ) input of the CPU 134.

A second parallel interface circuit 146 includes two DIP switches. The interface circuit 146 also includes a multiplexer and buffer for the switches. One of the DIP switches is used as a calibration switch. This switch is used to allow the CCM 40 to be matched to any contactor using a small calibrator (not shown) that is connected to the contactor and plugged into a connector on the side of the CCM. The switch also is used to program a compensation value into the mathematics routines used in the central processing unit. The calibrator is used because the voltage kick back peak shown in FIG. 2A may not correspond exactly with the actual tip opening event. In order to maintain a high level of accuracy, the switch setting is read during the calculations at the end of the tip opening cycle to compensate for any difference. The calibrator values are factory set during testing without power being connected to the contactor tips. The switches are used to set the time difference value in steps of 100 microseconds. One of the switch positions is used to tell the mathematics routine to add or subtract a compensation value. Another switch located in the interface circuit 146 is a slug delay switch. This latter switch acts like a binary counter that has a maximum count of 15 since it is a four position switch. The switch will cause a delay of 50 milliseconds times the number of counts during the contactor opening process thereby allowing a maximum delay of 750 milliseconds before the contactor begins opening.

5. Power MOFSET Switch

Before continuing with the description of FIG. 7, reference will now be made to FIG. 8 in which there is shown the power MOSFET switch for regulating current to contactor coil 34. The MOSFET switch 148 is an N-channel device with a rating of 500 volts at 8 amperes. The switch 148 switches the contactor coil power on and off under control of the central processor of FIG. 7. The device 148 is protected by a snubber circuit comprising a series connected resistor 150 and a capacitor 152 and by a pair of metal oxide varistors 154 and 156. The contactor coil 34 is connected between the 120 volts source from filter 100 and the drain terminal of the MOSFET 148. A one ohm resistor 158 is connected in the MOSFET source circuit to provide coil current measuring capability. MOSFET 148 is used as a switching regulator controlled by the central processor of FIG. 7. The on/off time of the MOSFET 148 is determined by measurement of the contactor coil current. In effect, the regulator is a pulse width modulation type of regulator. It will also be appreciated that the current through the coil 34, while interrupted by the switch 48, flows through the snubber circuit 150 and 152. Accordingly, very little ripple is seen in the coil current.

6. MOSFET Gate Driver

Figure 9:
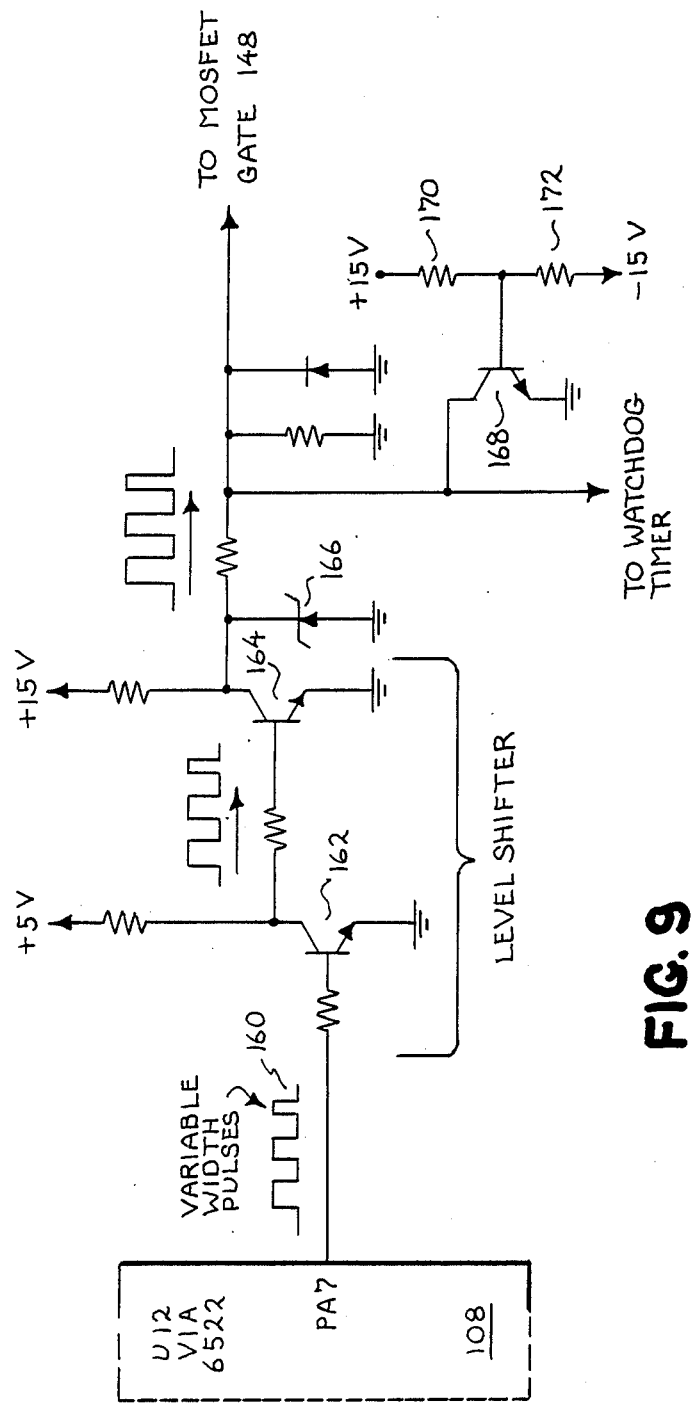

The driver circuit for MOSFET 148 is shown in FIG. 9. A train of variable width pulses 160 are coupled from the interface circuit 108 after being generated by the CPU 134 to a base terminal of a first transistor 162. A collector of transistor 162 is connected to a base terminal of a transistor 164. The transistors 162 and 164 together comprise a level shifter to bring the peak amplitude of the variable width pulses 160 to a suitable level for driving the MOSFET switch 148. It will be noted that the gate driver line is also coupled from the transistor 164 to the watch dog timer (not shown) for the purpose descibed above. A Zener diode 166 connected to the collector terminal of transistor 164 limits the maximum amplitude of the gate drive pulses 160 to 10 volts. Another transistor 168 is connected at the output of the gate drive circuit and serves to prevent operation of the contactor if the negative 15 volt power supply fails. This result is achieved by connecting the base of the transistor 168 through a first resistor 170 to the plus 15 volt supply and through a second resistor 172 to the minus 15 volt supply. In the event of failure of the negative power supply, transistor 168 will become conductive and shunt the drive pulses to MOSFET 148 to ground.

Returning again to FIG. 7, the analog to digital converter 116 is preferably a National Semiconductor ADC0808 type device having eight inputs, only five of which are used in the CCM 40. A first input is connected to monitor the magnitude of current flowing through the contactor coil 34. This monitoring function is provided by measuring the voltage developed across the 1 ohm resistor shown in FIG. 8. A second input is connected to monitor a signal representative of the current kick that develops in the contactor coil 34 when the contactor tips open. A third input is connected to monitor motor current as was described with reference to FIG. 5. A fourth input is connected to a voltage divider system (not shown) that is connected to the drain of the MOSFET 148 and produces a signal proportional to the voltage kick that occurs during contactor opening. Note that this signal is not the same as the signal referred to above as proportional current kick. The voltage kick signal is a more reliable indication of contactor tip opening and is preferably used rather than the current kick signal. The fifth input is used to monitor the magnitude of current flowing in phase C of the motor power line as described in FIG. 5. This signal will be described below in conjunction with the detection of vacuum loss.

A memory address decoder 174 is also shown in FIG. 7 and is of a type well known in the art. The memory address decoder is utilized as part of the communication loop for communicating between the CPU 134 and the various memory and processing devices attached to CPU 134.

7. Analog to Digital Interfaces

Referring now to FIG. 10, there is shown the analog monitor circuits for providing the coil status signals to A/D converter 116. The coil current feedback signal shown in FIG. 8 is coupled to first and second operational amplifiers 176 and 178. Amplifier 176 is a fixed gain amplifier and is used to develop a signal representative of coil current kickback. As noted above, this signal, although coupled to one of the input terminals (channel 2) of the A/D convertor 116 is preferrably not used since the voltage kickback is more reliable. The amplifier 178 is an adjustable gain amplifier and provides a buffer and level shift for coupling a coil current representative signal to channel 1 of converter 116.

The voltage kickback signal (see FIG. 8) is coupled to a voltage divider comprising resistors 180 and 182. A junction intermediate these resistors is coupled to a voltage follower circuit 184. An output terminal of circuit 184 is connected to channel 4 of converter 116. The A/D converter 116 operates to convert each of the above described analog signals to corresponding digital signals which are then processed by CPU 134.

The central processor shown in FIG. 7 has the primary control of the operation of vacuum interruptor 26. In order to understand the features of the invention, a description of the operation of the processor will now be given in terms of a number of software routines. The description is given in terms of a general discussion supported by software flow charts.

The power-up initialization routine performs several functions. The first step that occurs is initialization of the system stack pointer. The stack pointer must point to a location in RAM 142 and this must be done before any subroutines are called. All of the I/O ports must be configured since they all come up as input ports after a reset. Also the MOSFET gate 148 must be shut off to prevent the contactor 26 from picking up since after a power up the VIA 108 outputs are high until initialized. The power fail interrupt is enabled so that low control voltage can be detected. The EEPROM 144 write capability is disabled to prevent accidental destruction of data stored there. Then EEPROM 144 is read to obtain the last value of Y-delay that was stored and this value is stored in scratchpad RAM 142. Then the DIP switches in 146 are read to find the calibration and slug delay values programmed by the operator. Finally, the jump table for the ON/OFF routine is initialized and a few flags are cleared and initialized. The above steps are shown in FIG. 11.

After initialization, the central processor enters a routine labeled COFF (Contactor OFF). This routine loads the X index register with the location of the switch status jump table. The routine then sets up the outputs of the addressable latch to their proper state. Finally, the watchdog timer is pulsed and the ON/OFF switch status is checked. If the switch status has not changed, then the routine loops back and continues to wait. When the status does change, the processor exits the COFF routine and enters the CENG routine (Contactor Engage).

The COFF routine also performs a check for loss of vacuum. A loss of vacuum is detected by measuring the current flow in the three phases while the contactor is in the OFF position. If any current is flowing, at least one of the interruptors has lost vacuum. If this condition is detected, this routine outputs a voltage on the CPU connector to operate a solid state relay which can trip an upstream breaker (not shown) off-line and stop the current flow.

Referring to FIG. 12, upon entering the CENG routine, a command is sent to the MOSFET gate driver (FIG. 9) to switch on MOSFET 148 at full power. The timers in the 6522 interface 108 are used to create a ½ second time delay to allow the contactor armature to fully close. This also serves as automatic antikiss protection since an OFF command is not recognized until the time delay has expired. The routine is exited after ¼ of a second and the time delay is finished by the CREG routine (Contactor Regulation).

After the contactor 26 has picked up, the processor 134 enters the CREG routine. The purpose of this routine is to regulate the coil current at a predetermined value depending on the contactor. The routine performs this function by using a timer in the interface 108 to time the ON and OFF intervals of the MOSFET gate drive in conjunction with the three interrupt service routines. A location in scratchpad memory known as T_ON is used to hold the current value of ON time and this is initialized to $FF or maximum. After this, the index registers are initialized.

The 6809 CPU 134 has the capability to transfer contents of one register to another and this includes transferring the contents of any 16 bit register to the program counter. The regulator routine is interrupt driven and three different interrupt service routines may come into play during operation of CCM 40. Consequently, the Y-index register is used to point to the desired interrupt service routine and then when a fast interrupt request is received by the processor, the following instruction is executed: TFR Y,PC Transfer the contents of Y-Index Register to PC.

This causes the processor to begin executing the desired interrupt service routine at the address pointed to by the Y-index register. Therefore the Y-index register must be initialized to point to the desired interrupt service routine and the contents of this register must not be changed until fast interrupt requests are disabled. This provides an easy method of controlling the interrupt capabilities of CPU 134. Normally, the Y-index register points to the first interrupt routine REG_I. The Y-index register is only changed during shutdown at which time the second and third interrupt service routines are called.

After the above occurs, the X-index register is initialized to point to the exit table in scratchpad RAM 142. Finally, the fast interrupt request input to CPU 134 is enabled. The routine then reads the contactor coil current and determines if the coil current is at the correct value. If it is too high, the value of T_ON in RAM 142 is decremented. If the coil current is too low, then T_ON is incremented. After the checks are completed, the routine either continues to regulate or gets ready to shut the contactor down if the ON/OFF switch has returned to OFF.

The routine continues the ½ second delay that occurs at switch-on by utilizing a flag that is set or reset depending on the status of a second timer. After the second timer has completely timed out, the flag is cleared and does not affect the routine until another START command is received by the CCM.

The method used to exit this routine needs to be explained at this point. As described above, the X-index register is initialized to point to the exit table that is desired. This table consists of four 16 bit addresses in consecutive order. At the appropriate time in the routine, an indexed jump is performed after reading the ON/OFF switch value. The ON/OFF switch value will have a form as shown earlier. The value is shifted left one position to multiply it by 2 since there are 2 bytes in each address and an indirect jump of the form;

JMP [A,X]

is performed. The value in the A accumulator acts as an offset and causes the processor 134 to jump to the desired location as described by the contents of the jump table. If the START/STOP switch is still one, then the contents of the A accumulator will be such that the processor will jump to the beginning of the regulator routine and continue to regulate. The jump table is located in RAM 142 so that, if desired, the table can be modified to allow the processor 134 to jump to different locations as system operating conditions warrant. This technique is utilized by the interrupt service routines and the routines that operate during a shutdown sequence. This prevents the processor from executing unnecessary code over and over and wasting time.

Both the COFF and the CREG routines call a subroutine called STAT which returns the status of the START/STOP switch in the A accumulator. The STAT routine has a built in delay to prevent contact bounce from the START/STOP switch from causing problems.

There are four interrupt services routines utilized in CCM 40. Three of these routines are used by the coil current regulator and the fourth is an interrupt routine that is used under low voltage conditions when one of the power supply switching regulators 92 or 94 is interrupting the processor 134.

The first three routines are activated by the fast interrupt request input on CPU 134. The fast interrupt only pushes the contents of the program counter and the condition code register on the system stack during an interrupt acknowledge sequence. This allows the fast response to interrupts needed by the coil current regulator routines. The fourth interrupt service routine is the PFAIL routine that is activated by the IRQ input. Since this routine has a lower priority than the fast interrupt request input, the fast interrupt may interrupt this routine to continue regulation during power failure conditions.

A first regulator interrupt service routine (REG1) works in conjunction with CREG routine to regulate the coil current. The routine is a response to an interrupt request from VIA interface 108 to timer 1. The routine gets the value of T_ON (contactor ON time) from the system scratchpad RAM and places the value in Timer 1. The routine alternates between ON and OFF by complementing the gate driver output during each successive interrupt. Every other interrupt will be an OFF cycle and when this occurs the value of T_ON is complemented to determine the value of OFF time. As a result of this, the total ON_OFF time is 255 microseconds plus processor overhead time. The value of ON time is calculated by the CREG routine depending on the measured coil current. After the time is started, the processor returns to CREG and continues execution.

A second regulator interrupt service routine (REG2) performs the same function as the first interrupt routine except this routine also has the capability of detecting a zero crossing interrupt. When the START/STOP switch is switched to STOP, the processor jumps to the CURMES routine and checks the value of line current to determine if a controlled opening is justified. Then the SLUG routine is executed. If no deliberate slug delay has been requested, then the ZEROCR (zero crossing) routine is executed. This routine initalizes the zero crossing detectors in the VIA 108 and modifies the Y-index register to point to this interrupt service routine. The jump table is also modified to allow the processor 134 to bypass the now unnecessary code above this location. Now, as the processor 134 is regulating the coil current, it is also waiting for a zero crossing to occur. When the proper polarity crossing does occur, then a small extension routine is called to start the Y-delay time period. By using the zero crossing detector interrupt from the VIA 108, a faster and more accurate response to the zero crossing can be obtained than by using strictly polling techniques. After the Y-delay time period has been started, the contents of the Y-index register are again modified to point to the third interrupt service routine.

A third regulator interrupt service routine (REG3) also performs the regulator function as the second interrupt routine does but instead of waiting for a zero crossing to occur, this routine waits for Timer 2 in the VIA interface 108 to time out. Timer 2 is used to perform the Y-delay time out and when it has a timed out the VIA 108 interrupts the processor. This method allows a faster response to the Y-delay time out than polling methods. This improves the system accuracy considerably. When the Y-delay time period has expired, the processor is directed to jump directly to the contactor shut down routine without performing a return from interrupt. This leaves the stack pointer at a position down in the stack from its normal starting point so at the end of all the calculations, the stack pointer is restored to its normal starting position before another START request can be processed.

A power failure interrupt service routine is called in response to a IRQ interrupt. The IRQ input is connected to the power supply regulator (FIG. 8) and this interrupt is used to indicate reduced voltage output from the power supply rectifier. Essentially all this routine does is to maintain T_ON at its maximum level $FF (hexadecimal). The routine also monitors the START/STOP switch port to see if the switch is in the STOP position. If so, further IRQ interrupts are disabled and the contactor is allowed to drop out. The calculation flag is also cleared since a dropout under low power conditions may not be accurate and recalculation of the Y-delay time period is not desirable. During low power conditions, a WARNING light is also illuminated to indicate a low voltage condition.

A line current measuring routine (CURMES) reads the value of line current flowing in the motor circuit using the analog to digital converter circuit 116 and its input from rectifier 112. The value of line current must be above a certain minimum level to justify a recalculation after a timed contactor opening since motor currents that are too low can cause incorrect line current zero crossings due to harmonic content. If the current is too low, then the calculation flag is cleared to prevent calculations and the contactor is switched off. If the line current is above a maximum level, then the contactor is seeing a fault condition and the contactor is held on for a period of 5 seconds to allow the fuses time to clear the fault. This feature allows proper coordination of the contactor and the fuses.

Some special applications require deliberate time delays after a STOP command is received and before actually switching off the contactor coil power. This delay is known as "slugging." This was difficult to accomplish in prior art designs since the delay was accomplished by placing a copper jacket around the contactor coil to delay the decay of the magnetic field in the coil thereby delaying the contactor dropout. CCM 40 uses a timer to delay the dropout as requested by the setting of the DIP switches as discussed above. The value of the slug delay is found by reading the DIP switches during the power up sequence and storing the result in the system RAM 142. The slug delay routine reads this value and stores it in Timer 2 in the VIA 108. Timer 2 is used to count the number of ON and OFF cycles of Timer 1 during normal regulating duty. The counter counts down and when it reaches zero a flag will be set in the interrupt flag register of the VIA 108 and the routine will fall through to the zero crossing routine.

The zero crossing routine (ZEROCR) used Timer 2 in the VIA 108 as protection against a lack of line current. If no line current is flowing in the load, there will be no zero crossings to detect and CCM 40 will hang up waiting for a zero crossing to occur. Therefore, Timer 2 is used to prevent the CCM from hanging up in case there is a loss of line current. Timer 2 is set to time out after a time delay approximately equal to two electrical cycles. The zero crossing routine also alternates between a positive going and a negative going zero crossing to prevent uneven tip wear in the contactor caused by polarized tip openings. The zero crossing interrupt is enabled on the VIA 108 so that when a crossing of the proper polarity is detected the processor will be interrupted. This routine also modifies the Y-index register to point to the second interrupt service routine thereby starting the Y-delay interval.

When the expected zero crossing occurs, a flag is set in the interrupt flag register (IFR) in the VIA 108. The interrupt service routine examines the IFR and if the zero crossing flag is set, a short routine known as YDEL is called to start the Y-delay timer. The calculated value of Y-delay resides in system RAM 142 and is read by the processor 134 and stored in the timer to start the delay period. The Y-index register is again modified to point to the third interrupt service routine.

The third interrupt service routine (REG3) continues to regulate the contactor coil current and it also waits for Timer 2 to time out. When Timer 2 has expired, the Y-delay time period has elapsed and it is time to shut down the contactor 26. When Timer 2 times out, a flag in the IFR is set and an interrupt occurs. The processor 134 reads this flag and immediately jumps to the shut down routine.

It is essential that the shut down routine disable the interrupts to the processor 134 to prevent any unexpired time delays in the regulator routine from interrupting the processor; therefore, the first instruction executed in the SHUTDN routine is to disable the interrupts. The next thing that occurs is to shut down the contactor by turning off transistor 164. After the contactor has been shut down, CCM 40 starts Timer 2, enters a wait loop and waits for about 3 milliseconds (37 milliseconds for the 400 ampere contactor) to allow time for the initial coil voltage (or current) kickback to decay to a value low enough to be useful. The CCM then begins to sample the coil kickback looking for the first valley in the kickback voltage. After the first valley is detected, the next peak will be the point where the contactor tips open. When the peak occurs, Timer 1 is started to measure the time between the peak and the next zero crossing. This time is the value "X" discussed above. The time that is measured is used to evaluate whether or not the contactor rips have opened in the desired band. The latter steps are shown in FIG. 13.

The shut down routine also uses Timer 2 as a protection against loss of line current. If there is no current in the load, there will be no zero crossings for the CCM to detect. Timer 2 is set to time out in approximately 2 electrical cycles to prevent the CCM from hanging up. If Timer 2 times out a flag in the IFR will be set and can be tested by the processor. If the timer has timed out the processor clears the calculation flag and prevents the value of Y-delay from being changed to some incorrect value.

The mathematics routine initially tests the calculation (CALC) flag to see if it is clear. This flag is a location in RAM that is used to indicate if the contactor opening was valid. The opening will not be valid if there was no line current, if the input voltage was low enough to cause the power supply regulator to interrupt the processor or if the line current was too high indicating a fault in the motor circuit. The routine first reads the time that elapsed from the point where the tips opened and when the line current crossed zero. Then, this value is corrected by either adding or subtracting the calibration value as set by the DIP switch. The result is the corrected value of the elapsed time between tip opening and the final zero crossing of the line current.

The value of time that is calculated is compared to the desired time and the value of Y-delay is adjusted accordingly.

The routine also maintains a counter that indicates how many contactor operations have occurred since the last update of the EEPROM 144. The EEPROM 144 is updated every 10 contactor operations even if the openings were all on target and the value of Y-delay did not change much.

The EEPROM 144 is a serial device that has 16 locations. Each location has 16 bits available so the EEPROM appears as a 16 word storage element. Since the EEPROM is a serial device, the data that is read from or written to the device must be clocked in or out of the EEPROM one bit at a time. The EEPROM routines are designed to handle the data as required. One line on the VIA 108 is used as a data in and out line and an addressable latch is used to provide chip select and clock inputs to the EEPROM.

The EEPROM 144 is used to store the value of Y-delay for use on power up restarts. This prevents CCM 40 from having to "relearn" the contactor characteristics after every power-up restart. The upper most location of the EEPROM is used to point to the correct location in the EEPROM from which to read the value of Y-delay. The reason for this is because the EEPROM is guaranteed for a minimum of 100,000 write cycles and typical life of 1 million. Since maximum life is desired, the EEPROM routines write data to the chip and then reads it back and makes a comparison. If the data does not match, then several attempts are made to write to the EEPROM. If, after several tries have been made and the data is still bad, the location in EEPROM is assumed to be bad and the top most location of the EEPROM is incremented and the next location in the EEPROM is used for all further write operations until it too is worn out. If the EEPROM life is typical, the each location may be written to 1 million times before it fails. Since the EEPROM is only updated every 10 contactor operations, each location in EEPROM should last for 10 million contactor operations. The EEPROM has 15 locations usable for the value of Y-delay so the device should last for 150 million operations. The routine EEPERR performs the task of incrementing the pointer for Y-delay and storing it in the upper location in EEPROM.

The 400 ampere contactor version of the present invention contains a routine known as "AVERAG." This routine was placed in a 400 ampere system to handle a problem caused by the large inductance of a large contactor coil. The large inductance of the coil caused instability in the coil current regulator loop. This instability was due to the fact that the processor 134 could execute the regulator loop faster than the inductance of the coil would allow changes to the coil current. The solution to this problem was to, in effect, slow the regulator loop down by forcing it to sample the coil current four times and then calculating the average of the four samples before commanding a change in the coil current. This allows the coil current to stabilize before another change is commanded. This routine uses the user stack pointer as an index register. The pointer is initialized to point to a storage area in RAM and as each sample is taken the pointer is incremented to point to the next storage area in RAM. After the four samples are taken, the four values are added and two shift right instructions are executed on the sixteen bit result to calculate the average.

While the invention has been described in what is presently considered to be a preferred embodiment, many modifications and variations will become apparent to those skilled in the art. It is intended, therefore, that the invention be limited only by its true spirit and scope as set forth in the appended claims.

What is claimed is:

1. A control system used with an electromagnetic contactor having contact tips connected intermediate a source of alternating current and a load, the contact tips opening in response to removal of electrical power from an actuating coil of the contactor, the system comprising:

(a) regulating means for supplying electrical power to the actuating coil, said regulating means including means for interrupting power to the coil;
(b) means for monitoring the wave form of the alternating current for providing a signal indicative of each zero crossing;
(c) control means for receiving a contactor open command and for interrupting power to the coil, said control means being responsive to a contactor open command and to a first subsequently occurring zero crossing signal for interrupting the coil power a predetermined non-zero time interval prior to a second subsequently occurring zero crossing signal, said predetermined non-zero time interval being automatically adjusted such that the contact tips open a selected non-zero time interval before another predetermined subsequently occurring zero crossing signal and after a zero crossing signal immediately preceding said another subsequently occurring zero crossing signal.

2. The system of claim 1 and including means for determining a delay time interval between the opening of the contact tips and said another subsequently occurring zero crossing signal, and means for adjusting said predetermined non-zero time interval in a manner to minimize any difference between said delay time interval and said selected non-zero time interval.

3. The system of claim 2 wherein said contact tip opening is determined by measurement of voltage on the actuating coil, said contact tip opening being characterized by a peak in said coil voltage.

4. The system of claim 1 wherein said predetermined non-zero time interval is selected to effect contact tip opening between 30 and 55 electrical degrees before a zero crossing of the alternating current waveform.

5. The system of claim 1 wherein said regulating means includes means for establishing a substantially constant hold-in current in the actuating coil.

6. The system of claim 1 wherein said regulating means includes a switching transistor connected in series circuit with the actuating coil and a direct current source, said regulating means controlling current in the coil by switching said transistor between conducting and non-conducting states.

7. The system of claim 6 and including means for providing a signal representative of current in the actuating coil, means for comparing said current representative signal to a predetermined reference signal and means in said regulating means responsive to any difference between said current representative signal and said reference signal for varying the conducting state of said transistor in a manner to minimize that difference.

8. The system of claim 1 wherein the contacts are connected in a series circuit including a thermally actuated fuse for interrupting the circuit in the event of a fault current, said system including means for inhibiting said control means for a predetermined delay time interval after detection of a fault current whereby the fuse may interrupt the fault current.

9. The system of claim 8 wherein said predetermined delay time interval is between four and six seconds.

10. The system of claim 8 wherein direct current power for said control means and said regulating means is derived from the alternating current source, the system including a switching regulator for developing the direct current power and storage means chargeable from the alternating current source for providing power to said switching regulator during transient interruption of the alternating current source.

11. In a control system used with an electromagnetic contactor having contact tips connected intermediate a source of alternating current and a load, opening and closing of the contact tips being controlled by removal and application of electrical power to a contactor actuating coil, a method of reducing multiple re-ignitions comprising the steps of:
 (a) providing a regulated source of electrical power;
 (b) coupling the regulated power source to the coil through controllable switching means;
 (c) monitoring the alternating current through the contact tips;
 (d) developing a zero crossing signal each time that the alternating current crosses a zero reference; and
 (e) automatically adjusting opening of the contact tips in coordination with the zero crossing signals whereby the contact tips separate within a predetermined non-zero phase angle prior to a zero crossing and after an immediately preceding zero crossing.

12. The method of claim 11 wherein said step of coordinating includes the steps of:
 (a) determining for each zero crossing the direction of transition of the alternating current waveform;
 (b) storing data representative of the transition direction at each contact tip opening; and
 (c) interrupting power to the coil on succeeding occasions whereby alternate opening occurs on opposite transition directions.

13. A method for determining contact tip opening in a contactor control system for an electromagnetic contactor having an actuating coil and at least one set of contact tips which open in response to removal of electrical power from the actuating coil, the method comprising the steps of:
 monitoring voltage on the actuating coil;
 identifying a first voltage peak in the monitored voltage subsequent to removal of power from the actuating coil; and
 detecting occurrence of a second voltage peak following the first voltage peak, the second voltage peak occurring substantially coincidental with contact tip opening.

14. The method of claim 13 wherein the contact tips are connected intermediate an alternating current source and a load, the method including the steps of:
 determining a time-delay interval between removal of power from the actuating coil and the second peak;
 selecting a first electrical phase-angle of the alternating current through the contact tips for desirably opening the contact tips;
 computing a second phase-angle on one cycle of the alternating current which occurs the determined time-delay interval before the selected first electrical phase angle; and
 initiating subsequent contact tip openings by removal of electrical power from the actuating coil at a time coincidental with the alternating current passing though the second phase-angle.

* * * * *